United States Patent
Cheriton

(10) Patent No.: US 7,051,078 B1
(45) Date of Patent: May 23, 2006

(54) HIERARCHICAL ASSOCIATIVE MEMORY-BASED CLASSIFICATION SYSTEM

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1221 days.

(21) Appl. No.: 09/613,039

(22) Filed: Jul. 10, 2000

(51) Int. Cl.
*G06F 15/167* (2006.01)
*G06F 15/16* (2006.01)
*G06F 12/00* (2006.01)

(52) U.S. Cl. .............. 709/214; 709/215; 709/229; 709/245; 711/117; 711/122

(58) Field of Classification Search .............. 709/216, 709/215, 214, 217, 229, 245; 711/117, 112, 711/122
See application file for complete search history.

(56) References Cited

U.S. PATENT DOCUMENTS

| | | | |
|---|---|---|---|
| 5,386,413 A * | 1/1995 | McAuley et al. ......... 370/392 |
| 5,440,715 A | 8/1995 | Wyland |
| 5,450,351 A | 9/1995 | Heddes |
| 5,615,360 A | 3/1997 | Bezek et al. |
| 5,758,148 A | 5/1998 | Lipovski |
| 5,829,024 A * | 10/1998 | Sato ......................... 711/122 |
| 5,842,040 A | 11/1998 | Hughes et al. |
| 5,920,886 A * | 7/1999 | Feldmeier ................... 711/108 |
| 5,930,359 A | 7/1999 | Kempke et al. |
| 6,055,364 A | 4/2000 | Speakman et al. |
| 6,101,115 A | 8/2000 | Ross |
| 6,148,364 A | 11/2000 | Srinivasan et al. |
| 6,219,706 B1 | 4/2001 | Fan et al. |
| 6,289,414 B1 * | 9/2001 | Feldmeier et al. ......... 711/108 |
| 6,377,577 B1 | 4/2002 | Bechtolsheim et al. |
| 6,381,673 B1 | 4/2002 | Srinivasan et al. |
| 6,389,507 B1 | 5/2002 | Sherman |
| 6,480,931 B1 | 11/2002 | Buti et al. |
| 6,526,474 B1 | 2/2003 | Ross |
| 6,564,289 B1 | 5/2003 | Srinivasan et al. |
| 6,574,702 B1 | 6/2003 | Khanna et al. |
| 6,591,331 B1 | 7/2003 | Khanna |

OTHER PUBLICATIONS

U.S. Appl. No. 09/130,890, Ross et al.
U.S. Appl. No. 09/295,187, Gai et al.
Gupta, et al., Packet Classification on Multiple Fields, Proceedings of the Conference on Applications, Technologies, Architecures, and Protocols for Computer Communication, Association of Computing Machinery, (c)1999, pp. 147–160.

(Continued)

*Primary Examiner*—Zarni Maung
*Assistant Examiner*—Sahera Halim
(74) *Attorney, Agent, or Firm*—Cesari and McKenna, LLP

(57) ABSTRACT

A system and method for efficiently searching long strings of data, such as network messages, is described. The system preferably includes an associative memory structure, having a plurality of content addressable memories (CAMs). The CAMs are hierarchically arranged such the output of at least one CAM is used as the input to a second CAM. Preferably, a top-level CAM receives only a selected portion of the data string or network message as its input. The output of the top-level CAM is then joined with some or all of the remaining portions of the data string to form a new output that is provided to the CAM at the next lower level. The top-level CAM is programmed such that its output is substantially smaller (e.g., has fewer bits) than the selected data string portion that is input to the top-level CAM. The system can thus search data strings that are on the whole far longer than the widths of the respective CAMs forming the memory structure.

57 Claims, 6 Drawing Sheets

OTHER PUBLICATIONS

Sriinvasan, et al., Packet Classification on Using Tuple Space Search, Proceedings of the Conference on Applications, Technologies, Architectures, and Protocols for Computer Communication, Association of Computing Machinery, (c)1999, pp. 135–146.

Lakshman, et al., High–speed Policy–based Packet Forwarding Using Efficient Multi–dimensional Range Matching, Proceedings of the ACM SIGCOMM '98, Conference on Applications, Technologies, Architectures, and Protocols for Computer Communication, (c)1998, pp. 203–214.

Access control List: Overview and Guidelines, http://www.cisco.com/univercd/cc/t...113ed_cr/secur_c/scprt3/scacls.htm., Dec. 21, 1997, pp. 1–7.

Network Node Registry–Access Control Lists, http://www.net.gov.bc.ca/NNR/NNR_AL_doc.html, Apr. 18, 1997, pp. 1–5.

Gupta, Pankaj, Fast Routing Lookup Mechanisms, Seminar on High–speed Switching Laboratory of Computer Science, MIT, Mar. 16, 1998, pp. 1–31.

Wide Ternary Searches Using Music CAMs and RCPs, Music Semiconductors: Application Note AN–N31, Apr. 13, 1999, pp. 1–8.

* cited by examiner

| | ACL 101 | | | | |
|---|---|---|---|---|---|
| SOURCE ADDRESS | DESTINATION ADDRESS | SOURCE PORT | DESTINATION PORT | PROTOCOL | ACTION |
| 1362:2311:0000:0000:0000:4612:X:X | X:X:X:X:X:X:X:X | X | X | X | PERMIT |
| 2992:4612:0000:0000:0000:X:X:X:X | X:X:X:X:X:X:X:X | 80 | X | X | PERMIT |
| X:X:X:X:2201:8909:3A22:FACA | 2992:4612:0000:0000:X:X:X:X | X | X | X | DENY |
| 2992:8909:3A22:X:X:X:X:X | X:X:X:X:X:X:X:X | 100 | X | X | PERMIT AND LOG |
| 8526:6951:3698:0000:0000:7412:68DA:5000 | X:X:X:X:X:X:X:X | X | X | X | DENY AND LOG |
| 2113:9182:0000:0000:X:X:X:X | X:X:X:X:X:X:X:X | X | X | TCP | DENY |
| X:X:X:X:X:X:X:X | X:X:X:X:X:X:X:X | X | X | X | DENY |

FIG. 5

HIERARCHICAL ASSOCIATIVE MEMORY-BASED CLASSIFICATION SYSTEM

CROSS-REFERENCE TO RELATED APPLICATIONS

This application is related to the following, commonly owned U.S. patent application:

U.S. patent application Ser. No. 09/295,187 entitled, METHOD AND APPARATUS FOR ORGANIZING, STORING AND EVALUATING ACCESS CONTROL LISTS, filed Apr. 20, 1999, now U.S. Pat. No. 6,651,096.

BACKGROUND OF THE INVENTION

1. Field of the Invention

The present invention relates generally to computer networks, and more specifically, to a method and apparatus for configuring an associative memory device to efficiently perform matches against long input strings, such as network messages.

2. Background Information

A computer network typically comprises a plurality of interconnected entities that transmit (i.e., "source") or receive (i.e., "sink") data frames. A common type of computer network is a local area network ("LAN") which typically refers to a privately owned network within a single building or campus. LANs employ a data communication protocol (LAN standard), such as Ethernet, FDDI or Token Ring, that defines the functions performed by the data link and physical layers of a communications architecture (i.e., a protocol stack), such as the Open Systems Interconnection (OSI) Reference Model. In many instances, multiple LANs may be interconnected by network links to form a wide area network ("WAN"), metropolitan area network ("MAN") or intranet. These LANs and/or WANs, moreover, may be coupled through one or more gateways to the well-known Internet.

Each network entity preferably includes network communication software, which may operate in accordance with the Transmission Control Protocol/Internet Protocol (TCP/IP) suite of communication protocols. TCP/IP basically consists of a set of rules defining how entities interact with each other. In particular, TCP/IP defines a series of communication layers, including a transport layer and a network layer. At the transport layer, TCP/IP includes both the User Datagram Protocol (UDP), which is a connectionless transport protocol, and TCP which is a reliable, connection-oriented transport protocol. When a process at one network entity wishes to communicate with another entity, it formulates one or more network messages and passes them to the upper layer of the TCP/IP communication stack. These messages are passed down through each layer of the stack where they are encapsulated into segments, packets and frames. Each layer also adds information in the form of a header to the messages. The frames are then transmitted over the network links as bits. At the destination entity, the bits are re-assembled and passed up the layers of the destination entity's communication stack. At each layer, the corresponding message headers are stripped off, thereby recovering the original network message which is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports that couple the switch to several LANs and to other switches. The switching function includes receiving network messages at a source port and transferring them to at least one destination port for receipt by another entity. Switches may operate at various levels of the communication stack. For example, a switch may operate at layer 2, which, in the OSI Reference Model, is called the data link layer and includes both the Logical Link Control (LLC) and Media Access Control (MAC) sub-layers.

Other intermediate devices, commonly referred to as routers, may operate at higher communication layers, such as layer 3, which in TCP/IP networks corresponds to the Internet Protocol (IP) layer. IP message packets include a corresponding header which contains an IP source address and an IP destination address. Routers or layer 3 switches may re-assemble or convert received data frames from one LAN standard (e.g., Ethernet) to another (e.g. Token Ring). Thus, layer 3 devices are often used to interconnect dissimilar subnetworks. Some layer 3 devices may also examine the transport layer headers of received messages to identify the corresponding TCP or UDP port numbers being utilized by the corresponding network entities. Such extended-capability devices are often referred to as Layer 4, Layer 5, Layer 6 or Layer 7 switches or as Network Appliances. Many applications are assigned specific, fixed TCP and/or UDP port numbers in accordance with Request for Comments (RFC) 1700. For example, TCP/UDP port number 80 corresponds to the hyper text transport protocol (HTTP), while port number 21 corresponds to file transfer protocol (ftp) service.

FIG. 1 is a partial block diagram of a conventional Transport Layer segment 100 corresponding to the TCP protocol in which a Network Layer packet 102 corresponding to the IP protocol is encapsulated. Segment 100 includes a TCP header portion 104 that includes a plurality of fields. In particular, TCP header 104 includes a source port field 106 and a destination port field 108, among others. IP packet 102 similarly includes an IP header portion 110 that also comprises a plurality of fields. Specifically, IP header 110 includes an IP source address (SA) field 112, an IP destination address (DA) field 114, and a protocol field 116. IP packet 102, and thus segment 100, further includes a data portion 118. Headers 104 and 110 basically identify the local end points of the connection between the communicating entities and may also specify certain flow information.

Access Control Lists

Some networking software, including the Internetwork Operating System (IOS®) from Cisco Systems, Inc. of San Jose, Calif., supports the creation of access control lists or filters. These access control lists are typically used to prevent certain traffic from entering or exiting a network. In particular, a layer 3 device may utilize an access control list to decide whether a received message should be forwarded or filtered (i.e., dropped) based on certain predefined criteria. The criteria may be IP source address, IP destination address, or upper-layer application based on TCP/UDP port numbers. For example, an access control list may allow e-mail to be forwarded, but cause all Telnet traffic to be dropped. Access control lists may be established for both inbound and outbound traffic and are most commonly configured at border devices (i.e., gateways or firewalls).

To generate an access control list, a network administrator typically defines a sequence of criteria statements using a conventional text editor or graphical user interface (GUI). As each subsequent statement is defined, it is appended to the end of the list. The completed list is then downloaded to the desired layer 3 device where it may be stored in the device's non-volatile RAM (NVRAM) typically as a linked list. Upon initialization, the device copies the access control list to its dynamic memory. When a packet is subsequently received at a given interface of the device, a software module of IOS® tests the received packet against each criteria statement in the list. That is, the statements are checked in the order presented by the list. Once a match is found, the corresponding decision or action (e.g., permit or deny) is returned and applied to the packet. In other words, following the first match, no more criteria statements are checked. Accordingly, at the end of each access control list a "deny all traffic" statement is often added. Thus, if a given packet does not match any of the criteria statements, the packet will be discarded.

As indicated above, access control lists are used primarily to provide security. Thus, for a given interface, only a single list is evaluated per direction. The lists, moreover, are relatively short. Nevertheless, the evaluation of such lists by software modules can significantly degrade the intermediate device's performance (e.g., number of packets processed per second). This degradation in performance has been accepted mainly due to a lack of acceptable alternatives. It is proposed, however, to expand the use of access control lists for additional features besides just security decisions. For example, access control lists may also be used to determine whether a given packet should be encrypted and/or whether a particular quality of service (QoS) treatment should be applied. Accordingly, it is anticipated that multiple access control lists may be assigned to a single interface. As additional access control lists are defined and evaluated per packet, the reduction in performance will likely reach unacceptable levels.

To improve performance, some devices store access control lists in an associative memory, such as a ternary content addressable memory (TCAM). TCAM suppliers currently make TCAMs up to 144 bits in width. This has proven acceptable because the total number of bits being evaluated is on the order of 133. In particular, the message fields currently being evaluated by access control lists (i.e., the criteria) include IP source address, IP destination address, protocol, TCP/UDP source port, TCP/UDP destination port, virtual local area network (VLAN) identifier, differentiated services codepoint (DSCP), and the physical port on which the message was received. With version 4 of the Internet Protocol (IPv4), source and destination addresses are 32 bits in length. Accordingly, the above information, typically referred to as the flow label, adds up to approximately 133 bits, which is less than the width of available TCAMs.

With version 6 of the Internet Protocol (IPv6), however, network layer addresses are now 128 bits long. Assuming the same fields are to be evaluated, the flow labels being evaluated are now approximately 336 bits long, which is more than twice the size of current TCAMs. It is also proposed to evaluate higher-level messages, e.g., up to layer 7, which is the application layer. This would further increase the amount of information, and thus the number of bits, being evaluated. Technical limitations, however, currently prevent TCAMs from being built to widths on the order of 336 bits. Even if they could be built, such large TCAMs would likely have substantial power requirements and would thus be highly inefficient.

Accordingly, a need exists for a mechanism that can search long strings of data (e.g., 366 bits or more) at relatively high-speed.

SUMMARY OF THE INVENTION

Briefly, the invention relates to a system and method for efficiently classifying long strings of data, such as network messages, by matching them. The system includes a hierarchically arranged memory structure. In the illustrative embodiment, the memory structure includes a plurality of ternary content addressable memories (TCAMs), which are themselves hierarchically arranged. The TCAMs are programmed in a novel manner with the data to be matched, such as the predefined statements of one or more access control lists (ACLs), so as to allow messages that are longer than the width of the TCAMs to nonetheless be matched. In operation, a given network message is provided (e.g., input) to the hierarchical TCAMs and the particular action to be applied to that message, as specified by the matching ACL statement, is returned.

The hierarchical TCAMs include a top-level TCAM and at least one next-level TCAM. Each TCAM, moreover, may be associated with another memory device, such as a random access memory (RAM) having the same number of entries as its associated TCAM. According to the invention, the top-level TCAM is configured only to receive and match one or more sub-fields of the network message. In the illustrative embodiment, the longest sub-field(s) of the message (e.g., the network layer addresses) are selected for matching within the top-level TCAM. A match within the top-level TCAM specifies a corresponding record of its associated RAM. This record is programmed to contain an identifier that relates to, but is substantially shorter than, the sub-field that was searched (i.e., the network layer address). This identifier is then input into the next-level TCAM along with the remaining sub-fields of the message. A match within the next-level TCAM similarly specifies a corresponding record within its associated RAM. This record preferably specifies the particular action (e.g., drop, forward, encrypt, etc.) that is to be applied to the network message.

BRIEF DESCRIPTION OF THE DRAWINGS

The invention description below refers to the accompanying drawings, of which:

FIG. 5 is an illustration of an exemplary access control list; and

DETAILED DESCRIPTION OF AN ILLUSTRATIVE EMBODIMENT

Figure 1:
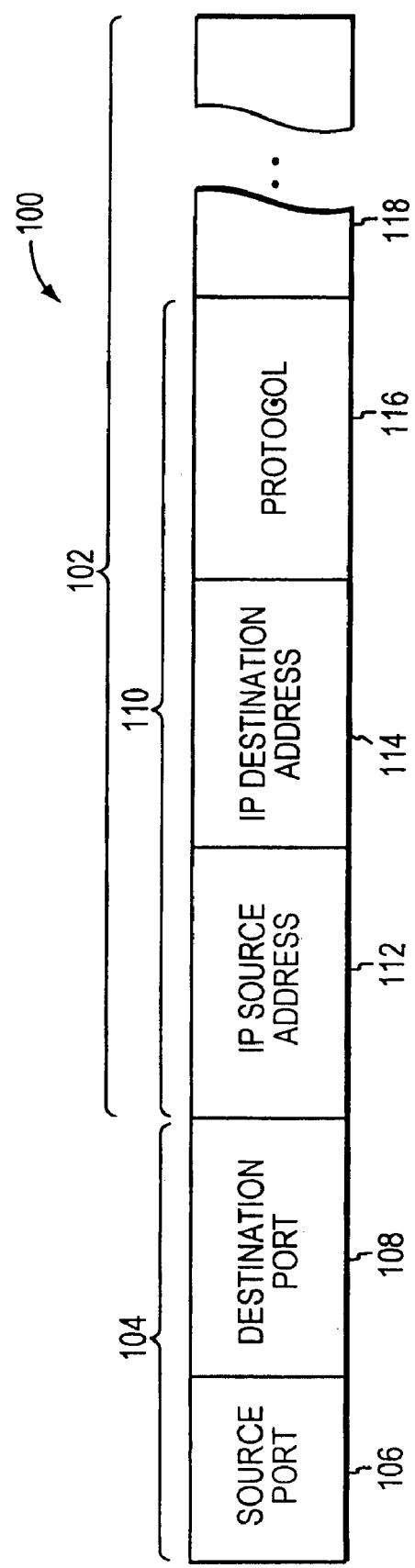
FIG. 1, previously discussed, is a block diagram of a conventional network message.
Figure 2:
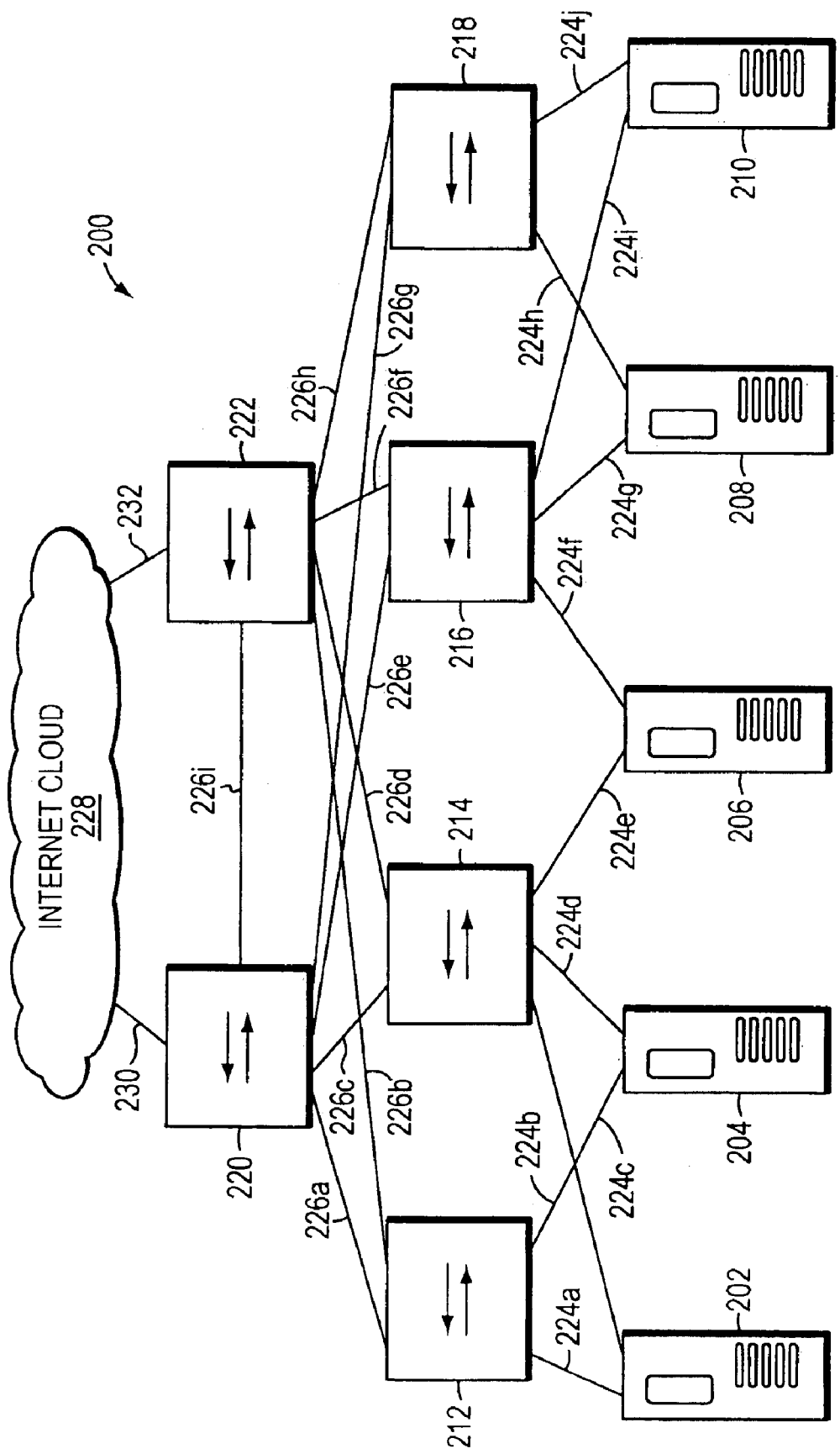
FIG. 2 is a highly schematic block diagram of a computer network.

FIG. 2 is a highly schematic illustration of a computer network 200. The network 200 includes a plurality of servers 202–210 and a plurality of intermediate network devices 212–222, such as backbone routers, high-speed switches, etc. Each server 202–210 is preferably coupled to two or more of the devices 212–222 by respective trunks or links 224a–j. Server 202, for example, is coupled to device 212 by link 224a, and to device 214 by link 224b. The devices 212–222 are similarly interconnected with each other by another set of trunks or links 226a–i. Significantly, the network 200 is also coupled to the well-known Internet, which may be represented by an Internet cloud 228. In particular, device 220 is coupled to the Internet 228 by link 230, and device 222 is coupled to the Internet 228 by link 232. Accordingly, network 200 allows users (not shown) who may be coupled to Internet cloud 228 through other networks or connections, to access any of the servers 202–210 and retrieve information posted on those servers 202–210.

It should be understood that the configuration of network 200 is meant for illustrative purposes only, and that the present invention will operate with other, possibly far more complex, network designs or topologies.

Figure 3:
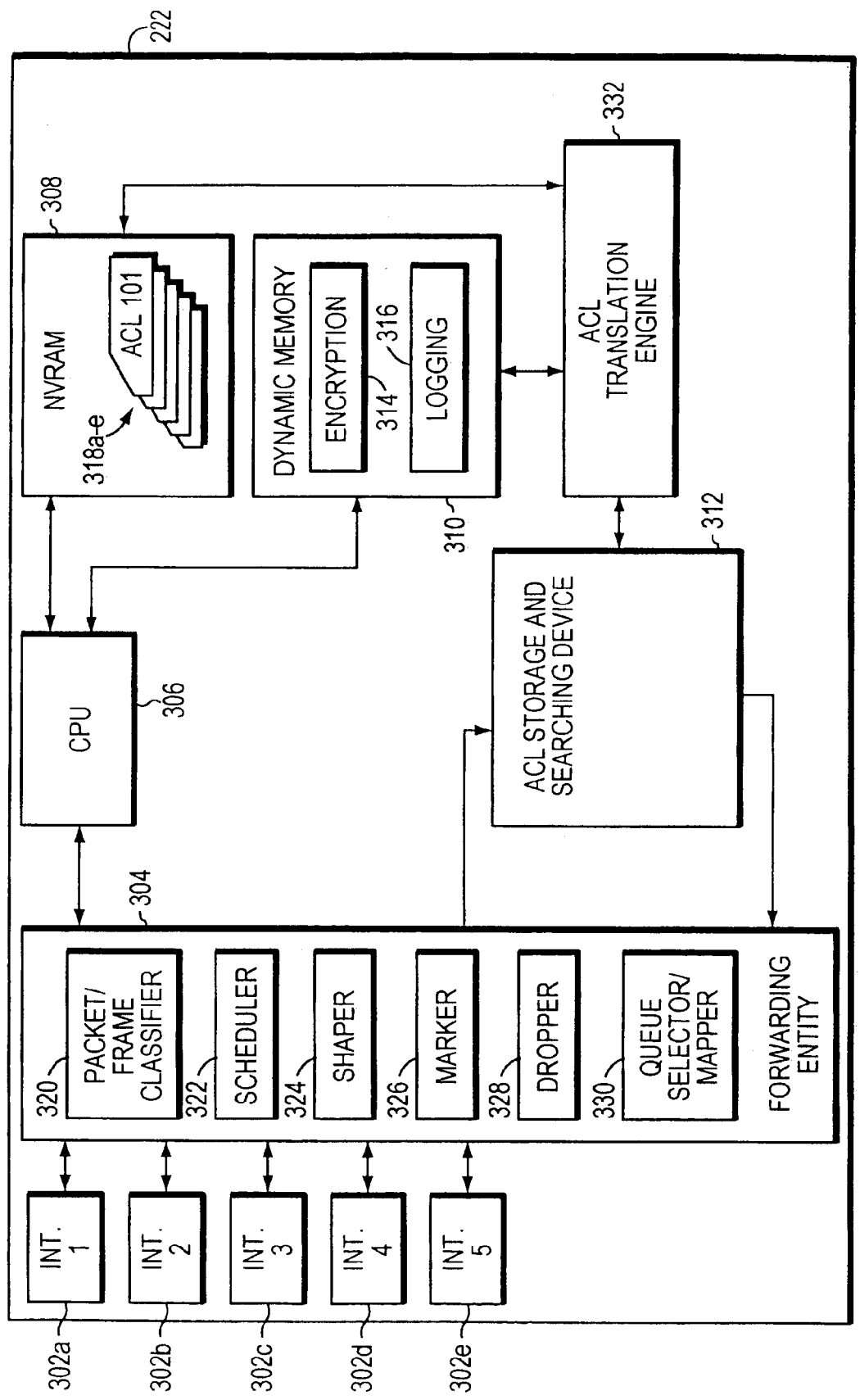
FIG. 3 is a partial, functional block diagram of an intermediate network device in accordance with the present invention.

FIG. 3 is a partial block diagram of intermediate network device 222. Device 222 preferably includes a plurality of interfaces 302a–302e that provide connectivity to the network 200 and the Internet 228. That is, interfaces 302a–302e are in communication with servers 202–210 and Internet 228. Each interface 302a–e, moreover, may be associated with one or more physical ports (not shown). Device 222 further includes at least one forwarding entity 304, a central processing unit (CPU) 306, non-volatile random access memory (NVRAM) 308, dynamic memory 310 and an Access Control List (ACL) storage and searching device 312. CPU 306 is coupled to both the NVRAM 308 and also to dynamic memory 310. NVRAM 308 may contain one or more text-based access control lists (ACLs) 318a–318e. Dynamic memory 310 may contain a plurality of applications or other programs, such as an encryption function 314 and a logging function 316, that may be executed by CPU 306.

Forwarding entity 304 may include a plurality of conventional sub-components configured to implement quality of service (QoS) treatments, such as a packet/frame classifier 320, a scheduler 322, a shaper 324, a marker 326, a dropper 328, and a queue selector/mapper 330. The forwarding entity 304 is also coupled to the CPU 306 and the ACL storage and searching device 312. As described below, the forwarding entity 304 is basically configured to forward or switch network messages among the various interfaces 302a–e of device 222.

Device 222 may further include an access control list (ACL) translation engine 332. ACL engine 332 is operatively coupled to NVRAM 308 for accessing the text-based ACLs 318a–e, dynamic memory 310 for processing the ACLs 318e, and to ACL storage and searching device 312 for storing modified versions of the ACLs 318a–e therein, as described below. ACL translation engine 332 preferably comprises computer readable media containing executable software programs, such as software modules or libraries, pertaining to the methods described herein.

It should be understood that ACL translation engine 332 may be stored at dynamic memory 310 and run on or otherwise be executed by CPU 306 or some other processing element (not shown). Engine 332 may also be implemented in hardware through a plurality of registers and combinational logic configured to produce sequential logic circuits and cooperating state machines. Those skilled in the art will recognize that other combinations of software and hardware implementations may be utilized.

A suitable platform for intermediate network device 222 are the Catalyst 4000 switches, Catalyst 8500® series of switch routers, and/or the Catalyst® 6000 family of multi-layer switches all from Cisco Systems, Inc. of San Jose, Calif.

Figure 4:
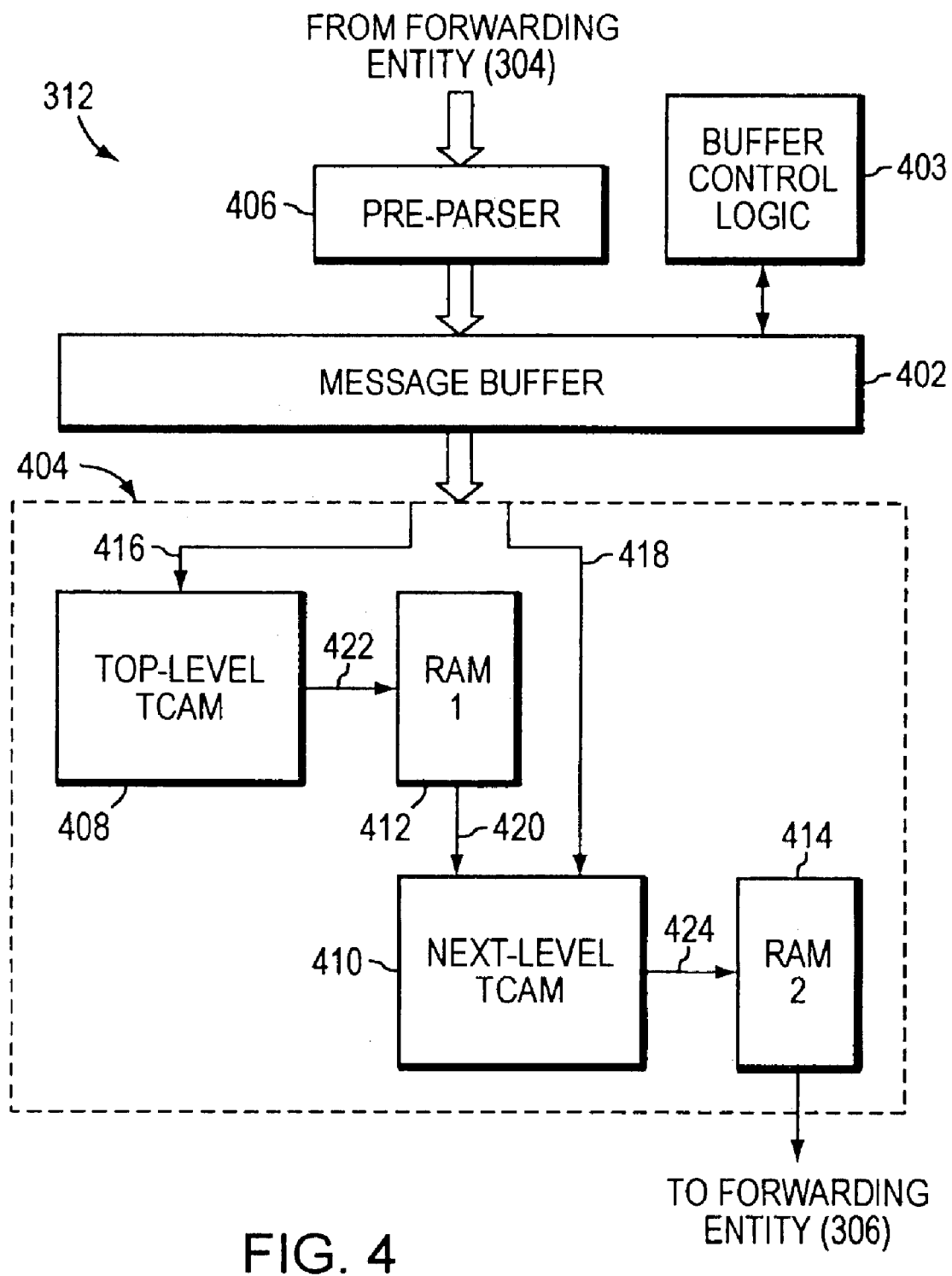
FIG. 4 is a highly schematic block diagram of the hierarchical, associative memory structure of the device of FIG. 3.

FIG. 4 is a highly schematic illustration of the ACL storage and searching device 312. ACL device 312 includes a message buffer 402, buffer control logic 403 and a hierarchically arranged associative memory structure 404. Device 312 may also include preparser logic 406. The associative memory structure 404 is preferably formed from a plurality of ternary content addressable memories (TCAMs) that are themselves hierarchically arranged, such that there is a top-level TCAM 408, and least one next level TCAM 410. Each TCAM 408, 410, moreover, may include another memory structure to which the respective TCAM 408, 410 is coupled. In the illustrative embodiment, top-level TCAM 408 is coupled to a first random access memory (RAM) 412, while next level TCAM 410 is coupled to a second RAM 414. Each TCAM 408, 410 has a plurality of entries and each entry is made up of a plurality of cells. The cells of the TCAMs 408, 410, moreover, are associated with or assigned one of three possible values (e.g., "0", "1" or "don't care"). Each RAM 412, 414 includes a plurality of records, such that each TCAM entry specifies a particular record in its associated RAM.

The preparser logic 406 is coupled to the forwarding entity 304 (FIG. 3) so as to receive messages therefrom. Preparser logic 406 is configured to extract one or more fields from the message which may then be temporarily stored in the message buffer 402. For example, preparser logic 406 may be configured to generate a desired flow label by extracting the contents of the destination and source ports, IP SA, IP DA and protocol fields, as well as the VLAN ID, DSCP and physical port on which the respective message was received. All of this information is preferably passed to and temporarily stored by the message buffer 402. Under the control of buffer control logic 403, the message buffer 402, in turn, supplies one or more of these fields to the top-level TCAM 408, and the remaining fields to the next-level TCAM 410, as illustrated by arrows 416 and 418, respectively. The output of each TCAM of the hierarchical memory structure 404 is preferably provided to its respective RAM, as illustrated by arrows 422 and 424. The output of first RAM 412 is supplied to the next level TCAM 410, as illustrated by arrow 420, while the output of second RAM 414 is returned to the forwarding entity 304.

As shown, the memory structure 404 is hierarchically arranged in that the output from at least one TCAM (e.g., the top-level TCAM 408) is provided as an input to another TCAM (e.g., the next level TCAM 410). In the illustrative embodiment, the top-level TCAM 408 is used to search one or more of the longer fields of the subject message (such as the IP DA and IP SA fields). When a match is located within the top-level TCAM 408, it specifies a corresponding entry in the first RAM 412 that contains an identifier that is related to the respective field. The identifier from the first RAM 412 is then input to the next level TCAM 410 along with the remaining fields of the subject message. Significantly, the identifier from the first RAM 412 is substantially shorter (has far fewer bits) than the field that was supplied to the top-level TCAM 408.

The top and next level TCAMs 408, 410 preferably have 512k or more rows and a length of 144 bits. A suitable TCAM for use with the present invention is described in co-pending U.S. patent appl. Ser. No. 09/130,890, filed Aug. 7, 1998, which is hereby incorporated by reference in its entirety. Other TCAMs that can be used with the present invention are commercially available from NetLogic Microsystems, Inc. of Mountain View, Calif. or from Music Semiconductors of Hackettstown, N.J. The TCAMs and their associated RAMs may be either static or dynamic.

Although the preferred embodiment of the memory structure 404 is described as a plurality of hierarchically arranged TCAMs, those skilled in the art to which the invention pertains will recognize that any associative memory devices, such as binary content addressable memories (CAMs), hash tables, etc., may be employed to achieve the advantages of the present invention. Binary CAMs, for example, only support exact matching. They do not allow for "don't care" values.

Creation and Assignment of ACLs to Interfaces

First, a network administrator creates one or more access control lists in a conventional manner. For example, the administrator preferably utilizes a conventional text editor at a management station (not shown) to create the access control lists. FIG. 5 is a highly schematic representation of text-based ACL 318*a*. Each access control list, such as ACL 318*a*, is given a name, such as ACL 101, and is preferably arranged in a table array having multiple rows and columns. Each row of the ACL, such as ACL 318*a*, corresponds to an Access Control Entry (ACE) statement, such as ACE statements 502–514, which specify the various criteria for the ACL 318*a*. The columns of the ACL represent the specific criteria with which network messages are compared. For example, ACL 318*a* includes a separate column for IP source address 516, IP destination address 518, TCP/UDP source port 520, TCP/UDP destination port 522 and transport protocol 524. Those skilled in the art will understand that additional message criteria (such as VLAN ID, DSCP, physical port, etc.) may advantageously be employed. ACL 318*a* further includes an action column 526 that corresponds to the particular action that is to be applied to network messages matching a corresponding ACE statement. Exemplary actions include permit, deny, permit and log, and deny and log, although other actions may be specified. For example, a possible action may be to execute a particular program stored in the non-volatile or dynamic memories of the respective device.

The text-based ACLs that are to be utilized at a given intermediate device are then downloaded to that device in a conventional manner and stored, preferably in non-volatile memory. In particular, the ACLs may be maintained in memory as ASCII text or in other formats. For example, ACLs 318*a*–318*e* may be downloaded to device 222 by the network administrator and stored at NVRAM 308. Next, the network administrator preferably assigns one or more ACLs 318*a*–*e* to each interface 302*a*–*e* per direction (e.g., inbound or outbound).

For example, the network administrator may assign ACL 318*a* (ACL 101) to interface 302 a for purposes of input security control. Accordingly, upon receipt of a network message at interface 302*a*, it is compared with ACE statements 502–514 of ACL 318*a*. As described below, the matching is preferably performed as a series of sequential steps starting with the first ACE 502 and moving, one ACE at a time, toward the last ACE 514 in the ACL. Once a match is located, the corresponding action is returned and the processing stops. That is, no additional ACEs are examined. If a match is made with an ACE statement having a "permit" action (e.g., ACE 502), the packet is forwarded. If a match is made with an ACE statement having a "deny" action (e.g., ACE 506), the packet is dropped. If the matching action is "permit and log", then the respective message is forwarded and an entry is made in a conventional message log. Similarly, if the matching action is "deny and log", then the respective message is dropped and a log entry made. If no ACE of the subject ACL matches the message, an implicit action located at the end of the ACL, e.g., ACE 514, is typically returned (e.g., permit or deny).

The value "x" of ACL 318*a* corresponds to a don't care condition. That is, the specified action is independent of the value at each "x" position of the message being tested. To define don't cares, an address (or other criteria) is typically supplied along with a "mask". The mask specifies which bits are significant and which are don't cares.

Programming the Hierarchical Associative Memory Structure

Figure 6:
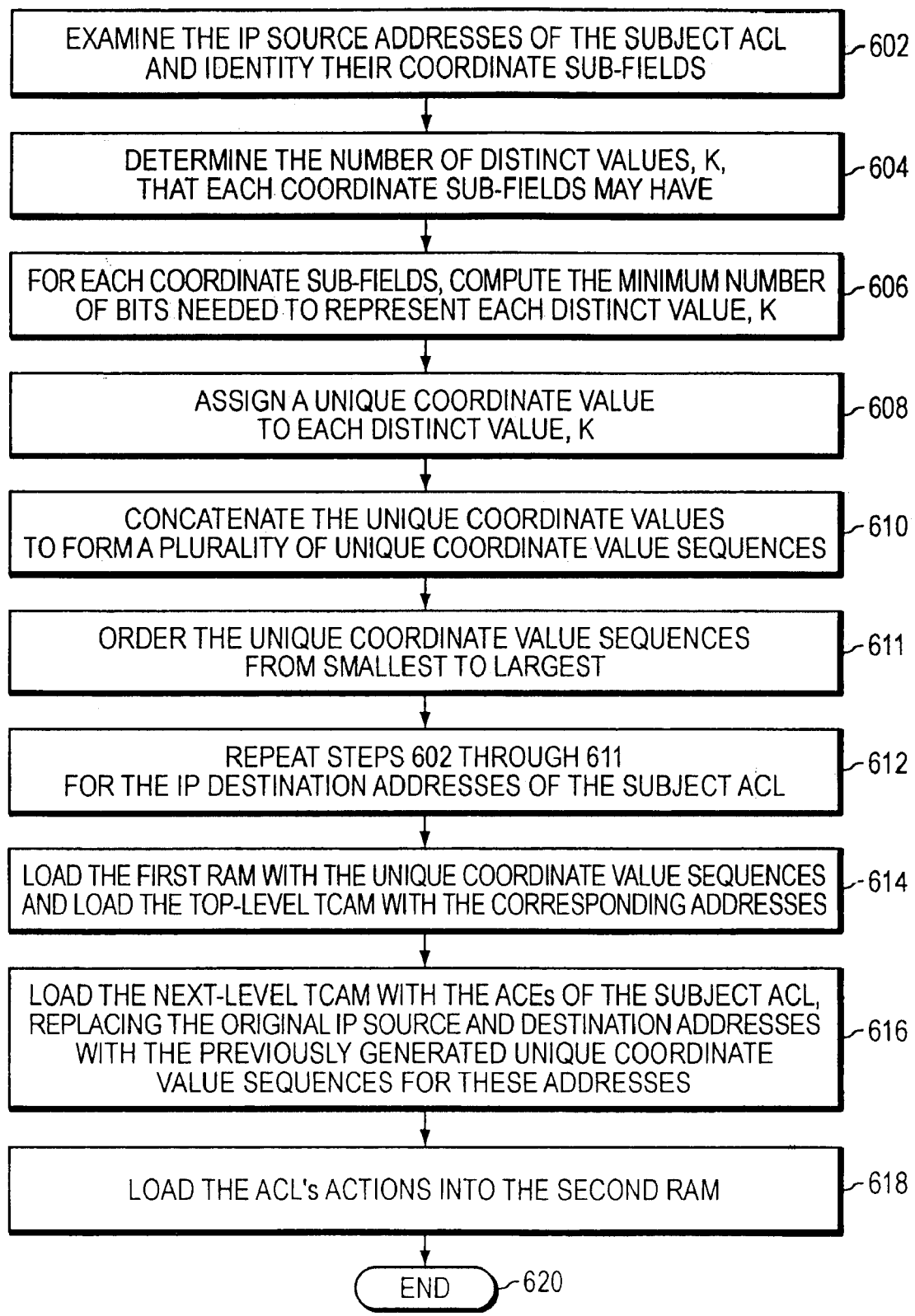
FIG. 6 is a flow diagram of the preferred method of the present invention.

FIG. 6 is a flow diagram of the steps used in programming the hierarchical memory 404 with the ACEs of a selected ACL, such as ACL 318*a*. As described above, with IPv6, the IP source address and IP destination address fields are each 128 bits long, the TCP/UDP source and destination port fields are each 16 bits long and the transport protocol field is 8 bits long. The total number of bits, namely 296, far exceeds the width of most commercially available TCAMs. Furthermore, if additional fields are to be evaluated, such as VLAN ID, DSCP and physical port, the problem only becomes worse. As described herein, the present invention provides a solution to searching long strings, such as the flow labels of IPv6 TCP/IP messages.

As indicated above, the IP source and destination address fields are the longest fields of the flow label. In the illustrative embodiment, it is these fields that are selected for programming into the top-level TCAM 408, while the remaining fields are programmed into the next level TCAM 410. Since the TCAMs 408, 410 only return the first matching entry for a given input, the order in which the addresses and ACEs are programmed into the TCAMs 408, 410 is important. As a general proposition, more specific ACEs should be placed ahead of less specific ACEs. In other words, ACEs with large numbers of don't cares should generally be placed into lower entries of the TCAMs 408, 410, so that more specific entries may be matched first.

As shown at block 602, one of the first steps in programming the top-level TCAM 408 is to examine all of the IP source addresses of the ACL and to identify "coordinate subfields". A coordinate subfield is basically a range of bit positions such that, for all of the IP source addresses, and/or destination addresses as the case may be, within the ACL, each IP address has either a specific value for the entire bit range or has all don't care values for the entire bit range.

ACL 318*a* (FIG. 5), for example, includes the following six IPv6 source addresses in hexadecimal format:

(1) 1362:2311:0000:0000:0000:4612:XXXX:XXXX (2) 2992:4612:0000:0000:XXXX:XXXX:XXXX:XXXX (3) XXXX:XXXX:XXXX:XXXX:2201:8909:3A22:FACA (4) 2992:8909:3A22:XXXX:XXXX:XXXX:XXXX:XXXX (5) 8526:6951:3698:0000:0000:7412:68DA:5000

(6) 2113:9182:0000:0000:XXXX:XXXX:XXXX:XXXX

The six IPv6 source addresses of ACL 318 a have four sub-fields. Specifically, assuming the addresses have a bit range of 127-0 from left to right, a first sub-field corresponds to the bit range 127-80, since all six source addresses have either a specific value across this entire range or all don't cares across the entire range. A second sub-field corresponds to the bit range of 79-64. A third sub-field corresponds to the bit range 63-32. A fourth sub-field corresponds to the bit range 31-0. For each of the addresses, the values within each sub-field are either all specific values or all don't care values (i.e., "Xs").

As indicated at block 604, the next step is to determine the number of distinct values, K, that each coordinate sub-field may have. The first sub-field, for example, has the following five distinct values:

1362:2311:0000
2992:4612:0000
2992:8909:3A22
8526:6951:3698
2113:9182:0000 plus an "other" value (i.e., XXXX:XXXX:XXXX). The second sub-field has one distinct value and an other value. The third sub-field has four distinct values and an other value. The fourth sub-field has two distinct values and an other value. After determining the number of distinct values, K, the next step is to compute the minimum number of bits needed to represent each distinct value, K, for each coordinate subfield, as indicated at block 606. This may be accomplished by using the following algorithm:

$$\log_2(K+1)$$

assuming an "other" value is also possible. Applying this algorithm, we find that the minimum number of bits needed to represent the five distinct and other values of the first sub-field is three. The number of bits needed to represent the second sub-field is one. The number of bits needed for both the third and the fourth sub-fields is two.

Next, for each sub-field, a "unique coordinate value" (UCV) is assigned to each distinct and other value K within that sub-field, as indicated at block 608. Considering the first sub-field, for example, there are five distinct values as well as an other value, and these values are to be represented with three bits. The distinct value "1362:2311:0000" may be assigned to UCV "000". The distinct value "2992:4612:0000" may be assigned to UCV "001". The distinct value "2992:8909:3A22" may be assigned to UCV "010". The distinct value "8526:6951:3698" may be assigned to UCV "011". The distinct value "2113:9182:0000" may be assigned to UCV "100". The other value "XXXX:XXXX:XXXX" may be assigned to UCV "101".

The distinct and other values of the remaining sub-fields may be assigned to the following unique coordinate values:

| Sub-field | Distinct Value | Unique Coordinate Value |
| --- | --- | --- |
| 2 | 0 | 0 |
| 2 | other | 1 |
| 3 | 0:4612 | 00 |
| 3 | 2201:8909 | 01 |
| 3 | 0:7412 | 10 |
| 3 | other | 11 |
| 4 | 3A22:FACA | 00 |
| 4 | 68DA:5000 | 01 |
| 4 | other | 10 |

As shown, the "other" values are preferably assigned the largest or highest UCV within the given range.

The UCVs are then concatenated to form a plurality of "unique coordinate value sequences" (UCVSs), as indicated at step 610. Continuing with the above example, the first, second, third and fourth sub-fields are represented by 5, 2, 4 and 3 UCVs, respectively. Accordingly, there are 5*2*4*3 or 120 possible UCVSs that can be formed by concatenating these UCVs. Each UCVS will correspond to an IPv6 address, and many of the UCVSs will correspond to an actual IP source address specified in ACL 318*a* (FIG. 5). For example, UCVS "00000010" corresponds to the first IPv6 source address in ACL 318*a*, 1362:2311:0000:0000:0000:4612:XXXX:XXXX. UCVS "00101110" corresponds to the second address, 2992:4612:0000:0000:XXXX:XXXX:XXXX:XXXX, UCVS "10110100" corresponds to the third address, XXXX:XXXX:XXXX:2201:8909:3A22:FACA, and so on. The UCVSs are then ordered from smallest (e.g., 00000000) to largest (e.g., 10111110), as indicated at step 611. Since each "other" value was assigned the largest UCV in the given range, the ordering of UCVSs from smallest to largest will place the more specific UCVSs first. In particular, UCVS "00000000" corresponds to very specific IPv6 source address, namely 1362:2311:0000:0000:0000:4612:3A22:FACA, while UCVS "10110100" corresponds to a less specific address, namely XXXX:XXXX:XXXX:XXXX:2201:8909:3A22:FACA, and UCVS "10111110" corresponds to address XXXX:XXXX:XXXX:XXXX:XXXX:XXXX:XXXX:XXXX.

As indicated at block 612, steps 602-611 are then preferably repeated for the IP destination addresses of ACL 318*a*.

The top-level TCAM 408 is then loaded with IP addresses, while the first RAM 412 is loaded with the corresponding UCVSs, as indicated at block 614. The top-level TCAM 408 is preferably loaded with IP addresses such that the corresponding UCVSs go from smallest to largest (i.e., in increasing order). For example, the first row of the top-level TCAM 408 is loaded with IP source address 1362:2311:0000:0000:0000:4612:3A22:FACA, which corresponds to the smallest UCVS (i.e., 00000000), and this UCVS, moreover, is loaded in the particular record at the first RAM 412 that is associated with the first row of TCAM 408. Thus, a match to this row of the top-level TCAM 408 will cause the first RAM to output the value 00000000. This process is repeated until all of the UCVSs and the corresponding addresses have been loaded into the first RAM 412 and the top-level TCAM 408.

It should be understood that when an IP address having a sub-field of (i.e., don't cares), then the mask for the cells of that particular sub-field is set to indicate that the cells are don't cares.

Each row of TCAM 408 preferably includes an additional bit or cell that is used to indicate whether the UCVS associated with that row is a source or destination address. For example, if this cell is asserted, then the UCVS is associated with a source address. If the cell is de-asserted, then the UCVS is associated with a destination address. Alternatively, the computation of UCVs and UCVSs may be made across the entire set of source and destination addresses simultaneously. In another embodiment, a first top-level TCAM and associated RAM could be used for IP source addresses while a second top-level TCAM and associated RAM is used for IP destination addresses.

As shown, each of the 128-bit IPv6 source and destination addresses of the ACL 318 *a* has been reduced to just 8 bits.

The next level TCAM 410 is then loaded with the criteria fields (i.e., columns 516–524) of the ACEs 502–514 of ACL 318*a*, but with the source and destination IPv6 address fields from columns 516 and 518 replaced with their corresponding UCV-concatenated (i.e., UCVS) versions with the TCAM mask set to don't care for each UCV sub-field of the UCVS that corresponds to "other" values, as indicated at step 616. For example, when UCVS "00101110", which corresponds to IPv6 address 2992:4612:0000:0000:XXXX:XXXX:XXXX:XXXX, is loaded into the next level TCAM 410, the mask for the last four bit positions (i.e., "1110") is set to don't care. The ACL actions from column 526 are then loaded into second RAM 414, as indicated at block 618. The hierarchical memory structure 404 is now fully programmed as indicated by end block 620, and may be utilized by device 222 to evaluate messages.

For example, suppose that device 222 receives a network message on interface 302a that originated from the Internet cloud 228. The message is passed to the forwarding entity 304 which provides it to the ACL storage and searching device 312. At the ACL storage and searching device 312, the pre-parser 406 extracts the relevant fields for generating a flow label and temporarily stores this flow label in the message buffer 402. The buffer control logic 403 then directs the message buffer 402 to input the IP source and destination addresses from the flow label into the top-level TCAM 408 either simultaneously or sequentially via arrow 416.

If the top-level TCAM 408 detects a match to the input address, a corresponding record in the first RAM 412 is specified, as shown by arrow 422. As discussed above, this record contains the UCVS derived for the matching address. Furthermore, although the input address may have been 128 bits long, the corresponding UCVS is far shorter (i.e., only 8 bits long). The UCVS for both the IP source address and the IP destination address are then input to the next-level TCAM 410 via arrow 420. Buffer control logic 403 also directs the message buffer 402 to input the remaining fields from the flow label (e.g., TCP/UDP source and destination ports, protocol, VLAN ID, DSCP, and physical port) into the next-level TCAM 410 via arrow 418. Since the IP source and destination addresses have been effectively translated into their much shorter UCVSs, all of this data is now able to fit within the width of the next-level TCAM 410.

If the next-level TCAM 410 detects a match to the flow label, a corresponding record in the second RAM 414 is specified, as shown by arrow 424. As discussed above, this record contains the action for the message. This action is then passed by the second RAM 414 to the forwarding entity 304 which carries out the specified action (e.g., permit, drop, permit and log, drop and log, etc.) on the message.

To improve performance, the hierarchical memory structure 404 may be utilized to examine two or more messages substantially simultaneously. More specifically, at the same time that the UCVSs and remaining fields corresponding to the flow label of a first message are being used to search the next level TCAM 410, the IP addresses from the flow label of a second message may be input into the top-level TCAM 408 in order to identify their corresponding UCVSs. In this embodiment, there may be multiple message buffers, buffer controls and pre-parser logic circuits.

It should be understood that the length of the UCVSs for an ACL having more entries than ACL 318a may be significantly greater than 8 bits. In a preferred embodiment, UCV sequences on the order of 32 bits in length are derived and utilized within ACL storage and searching device 312 in the manner described above.

It should be further understood that the translation of IP addresses to their UCVSs and the subsequent programming of the ACL storage and searching device 312, as described above with reference to FIG. 6, may be performed remotely from device 222. For example, these functions may be performed at a management station and the results remotely programmed into the ACL storage and searching device 312. In this case, there would be no need for the device 222 to include an ACL translation engine 332.

Depending on the length of the data string being searched, moreover, the hierarchical associative memory 404 may contain additional TCAM levels. In other words, the output of next-level TCAM 410 may be input to yet another TCAM along with still further fields from the message buffer, and so on. At each level (except for the last and final level), one or more fields of the data string are converted to their corresponding UCVSs for inputting into the next lower TCAM. As a result, the hierarchical associative memory 404 of the present invention may be able to search data strings that are far longer than the individual TCAMs are wide.

It should also be understood that the output of the top-level (or any other) TCAM may be processed (e.g., subjected to some algebraic expression or function), thereby generating some new value that is input to the next-level TCAM. In other words, the output of one TCAM may be directly or, as described here, indirectly coupled to the next-level TCAM. Similarly, one or more fields of the data string may be pre-processed generating a derived value which is then input to the top-level (or any other) TCAM. Thus, the inputs to a TCAM level may consist of any combination of: the output of a higher level TCAM, the processed output of a higher level TCAM, one or more fields of the data string, and one or more values derived from one or more fields of the data string.

The foregoing description has been directed to specific embodiments of this invention. It will be apparent, however, that other variations and modifications may be made to the described embodiments, with the attainment of some or all of their advantages. For example, the techniques of the present invention may be applied to searching other long data strings such as URLs or other data records or files within an associative memory structure. Therefore, it is an object of the appended claims to cover all such variations and modifications as come within the true spirit and scope of the invention.

What is claimed is:

1. A hierarchical memory structure for use in matching a data string having a plurality of fields, the memory structure comprising:

a top-level associative memory; and at least one next-level associative memory operably coupled to the top-level associative memory so as to receive an output therefrom, wherein the top-level associative memory is configured to receive and match one or more of the fields of the data string and, in response to detecting a match, providing an output to the next-level associative memory, the output of the top-level associative memory has a length that is shorter than a length of the one or more fields of the data string; and the at least one next-level associative memory is configured to receive and match the output from the top-level associative memory plus one or more other fields of the data string or one or more values derived therefrom and, in response to detecting a match, outputting a result.

2. The hierarchical memory structure of claim 1 wherein the data strings being matched are network messages.

3. The hierarchical memory structure of claim 2 wherein the one or more fields input to the top-level associative memory include an Internet Protocol (IP) address field.

4. The hierarchical memory structure of claim 1 wherein the top-level associative memory and next-level associative memory are each ternary content addressable memories (TCAMs) that support don't care values.

5. The hierarchical memory structure of claim 4 wherein the data strings being matched are network messages.

6. The hierarchical memory structure of claim 5 wherein the one or more fields input to the top-level associative memory include an Internet Protocol (IP) address field.

7. The hierarchical memory structure of claim 4 further comprising a plurality of records organized into common fields, wherein
   at least one field of each record, which originally contained a corresponding value, is replaced with a unique coordinate value (UCV) that has been generated for the corresponding value, and
   each UCV is shorter than the corresponding value that it replaces.

8. The hierarchical memory structure of claim 1, wherein the length of the output of the top-level associative memory is on the order of one-fourth or less of the length of the one or more fields of the data string that are input into the top-level associative memory.

9. The hierarchical memory structure of claim 8 further comprising a first memory structure associated with the top-level associative memory, the top-level associative memory and first memory structure configured such that, in response to detecting a match to an entry in the top-level associative memory, the top-level associative memory specifies a location of the first memory structure containing the output that is provided to the at least one next level associative memory.

10. The hierarchical memory structure of claim 9 further comprising a message buffer for temporarily storing the data string, and buffer control logic for providing selected fields from the message buffer to the top-level and next-level associative memories.

11. The hierarchical memory structure of claim 1 further comprising:
   a first memory structure associated with the top-level associative memory, the top-level associative memory and first memory structure configured such that, in response to detecting a match to an entry in the top-level associative memory, the top-level associative memory specifies a location of the first memory structure containing the output that is provided to the at least one next level associative memory, and
   a second memory structure associated with the at least one next-level associative memory, the next-level associative memory and second memory structure configured such that, in response to detecting a match to an entry in the next-level associative memory, the next-level associative memory specifies a location of the second memory structure containing information related to the matching next-level associative memory entry.

12. The hierarchical memory structure of claim 11 wherein the first and second memory structures are random access memories (RAMs).

13. The hierarchical memory structure of claim 12 wherein the data strings being matched are network messages and the one or more fields input to the top-level associative memory include an Internet Protocol (IP) address field.

14. The hierarchical memory structure of claim 13 wherein the output of the first RAM has a length that is shorter than the IP address input into the top-level associative memory.

15. The hierarchical memory structure of claim 14 wherein the length of the output of the top-level associative memory is on the order of one-fourth or less of the length of the one or more fields of the data string that are input into the top-level associative memory.

16. The hierarchical memory structure of claim 1 further comprising a plurality of records organized into common fields, wherein
   at least one field of each record, which originally contained a corresponding value, is replaced with a unique coordinate value (UCV) that has been generated for the corresponding value, and
   each UCV is shorter than the corresponding value that it replaces.

17. A method for matching a data string, comprising:
   providing a top-level associative memory;
   coupling to the top-level associative memory an at least one next-level associative memory, the at least one next-level associative memory receiving an output from the top-level associative memory;
   configuring the top-level associative memory to receive and match one or more of the fields of a data string, the data string having a plurality of fields, and, in response to detecting a match, providing an output to the next-level associative memory arranging the output of the top-level associative memory to have a length that is shorter than a length of the one or more fields of the data string; and
   configuring the at least one next-level associative memory to receive and match the output from the top-level associative memory, and in response to detecting a match, outputting a result.

18. The method of claim 17, further comprising:
   configuring the at least one next-level associative memory to further receive and match one or more other fields of the data string, and in response to detecting a match, outputting the result.

19. The method of claim 17, further comprising:
   using network messages as the data string.

20. The method of claim 17, further comprising:
   including an Internet Protocol (IP) address field in the one or more fields input to the top-level associative memory.

21. The method of claim 17, further comprising:
   using for the top-level associative memory a ternary content addressable memory (TCAM) that supports don't care values, and using for the next-level associative memory a ternary content addressable memory (TCAMs) that supports don't care values.

22. The method of claim 17, further comprising:
   using network messages as the data strings.

23. The method of claim 17, further comprising:
   arranging the length of the output of the top-level associative memory to have a length on the order of one-fourth or less of the length of the one or more fields of the data string that are input into the top-level associative memory.

24. The method of claim 17, further comprising:
   associating a first memory structure with the top-level associative memory; and
   configuring the top-level associative memory, in response to detecting a match to an entry in the top-level associative memory, to specify a location in the first memory structure, the location containing the output that is provided to the at least one next level associative memory.

25. The method of claim 17, further comprising:

temporarily storing the data string in a message buffer; and providing selected fields from the message buffer to the top-level and next-level associative memories by a buffer control logic.

26. The method of claim 17, further comprising:

configuring a first memory structure associated with the top-level associative memory, such that, in response to detecting a match to an entry in the top-level associative memory, the top-level associative memory specifies a location in the first memory structure containing the output that is provided to the at least one next level associative memory; and configuring a second memory structure associated with the at least one next-level associative memory, such that, in response to detecting a match to an entry in the next-level associative memory, the next-level associative memory specifies a location in the second memory structure containing information related to the matching next-level associative memory entry.

27. The method of claim 26, further comprising:

using random access memories (RAMs) as the first and second memory structures.

28. The method of claim 26, further comprising:

providing an output of a first RAM used as the first memory structure with a length that is shorter than an IP address input into the top-level associative memory.

29. The method of claim 17, further comprising:

organizing the hierarchical memory structure into fields for storing a plurality of records;

replacing at least one field, which originally contained a corresponding value, with a unique coordinate value (UCV) that has been generated for the corresponding value, and making each UCV shorter than the corresponding value that it replaces.

30. An associative memory apparatus to match a data string, comprising:

means for providing a top-level associative memory;

means for coupling to the top-level associative memory an at least one next-level associative memory, the at least one next-level associative memory receiving an output from the top-level associative memory;

means for configuring the top-level associative memory to receive and match one or more of the fields of a data string, the data string having a plurality of fields, and, in response to detecting a match, providing an output to the next-level associative memory means for arranging the output of the top-level associative memory to have a length that is shorter than a length of the one or more fields of the data string; and means for configuring the at least one next-level associative memory to receive and match the output from the top-level associative memory, and in response to detecting a match, outputting a result.

31. The apparatus as in claim 30, further comprising:

means for configuring the at least one next-level associative memory to receive and match one or more other fields of the data string, and in response to detecting a match, outputting the result.

32. The apparatus as in claim 30, further comprising:

using network messages as the data string.

33. The apparatus as in claim 30, further comprising:

means for including an Internet Protocol (IP) address field in the one or more fields input to the top-level associative memory.

34. The apparatus as in claim 30, further comprising:

means for using for the top-level associative memory a ternary content addressable memory (TCAM) that supports don't care values, and using for the next-level associative memory a ternary content addressable memory (TCAMs) that supports don't care values.

35. The apparatus as in claim 30, further comprising:

means for using network messages as the data strings.

36. The apparatus as in claim 30, further comprising:

means for arranging the length of the output of the top-level associative memory to have a length on the order of one-fourth or less of the length of the one or more fields of the data string that are input into the top-level associative memory.

37. The apparatus as in claim 30, further comprising:

means for associating a first memory structure with the top-level associative memory; and means for configuring the top-level associative memory, in response to detecting a match to an entry in the top-level associative memory, to specify a location in the first memory structure, the location containing the output that is provided to the at least one next level associative memory.

38. The apparatus as in claim 30, further comprising:

means for temporarily storing the data string in a message buffer; and means for providing selected fields from the message buffer to the top-level and next-level associative memories by a buffer control logic.

39. The apparatus as in claim 30, further comprising:

means for configuring a first memory structure associated with the top-level associative memory, such that, in response to detecting a match to an entry in the top-level associative memory, the top-level associative memory specifies a location in the first memory structure containing the output that is provided to the at least one next level associative memory; and means for configuring a second memory structure associated with the at least one next-level associative memory, such that, in response to detecting a match to an entry in the next-level associative memory, the next-level associative memory specifies a location in the second memory structure containing information related to the matching next-level associative memory entry.

40. The apparatus as in claim 39, further comprising:

means for using random access memories (RAMs) as the first and second memory structures.

41. The apparatus as in claim 39, further comprising:

means for providing an output of a first RAM used as the first memory structure with a length that is shorter than an IP address input into the top-level associative memory.

42. The apparatus as in claim 39, further comprising:

means for organizing the hierarchical memory structure into fields for storing a plurality of records;

means for replacing at least one field, which originally contained a corresponding value, with a unique coordinate value (UCV) that has been generated for the corresponding value, and means for making each UCV shorter than the corresponding value that it replaces.

43. An associative memory apparatus to match a data string, comprising:

a top-level associative memory;

at least one next-level associative memory coupled to the top-level associative memory, the at least one next-level associative memory receiving an output from the top-level associative memory, and the top-level associative memory configured to receive and match one or more of the fields of a data string, the data string having a plurality of fields, and, in response to detecting a match, providing an output to the next-level associative memory the output of the top-level associative memory has a length that is a shorter than a length of the one or more fields of the data string; and the at least one next-level associative memory configured to receive and match the output from the top-level associative memory, and in response to detecting a match, outputting a result.

44. The apparatus as in claim 43, further comprising:

the at least one next-level associative memory further configured to receive and match one or more other fields of the data string, and in response to detecting a match, outputting the result.

45. The apparatus as in claim 43, further comprising:

a network message used as the data string.

46. The apparatus as in claim 43, further comprising:

an Internet Protocol (IP) address field included in the one or more fields input to the top-level associative memory.

47. The apparatus as in claim 43, further comprising:

a ternary content addressable memory (TCAM) used as the top-level associative memory, the ternary content addressable memory (TCAM) supporting don't care values.

48. The apparatus as in claim 43, further comprising:

a ternary content addressable memory (TCAMs) that supports don't care values used for the next-level associative memory.

49. The apparatus as in claim 43, further comprising:

a network message used as the data string.

50. The apparatus as in claim 43, further comprising:

the output of the top-level associative memory having a length on the order of one-fourth or less of the length of the one or more fields of the data string that are input into the top-level associative memory.

51. The apparatus as in claim 50, further comprising:

a random access memory (RAMs) used as the and second memory structure.

52. The apparatus as in claim 43, further comprising:

a first memory structure associated with the top-level associative memory, and the top-level associative memory, in response to detecting a match to an entry in the top-level associative memory, specifying a location in the first memory structure, the location containing the output that is provided to the at least one next level associative memory.

53. The apparatus as in claim 43, further comprising:

a message buffer to temporarily store the data string; and a buffer control logic to provide selected fields from the message buffer to the top-level and next-level associative memories.

54. The apparatus as in claim 43, further comprising:

a first memory structure associated with the top-level associative memory configured, such that, in response to detecting a match to an entry in the top-level associative memory, the top-level associative memory specifies a location in the first memory structure, the location containing the output that is provided to the at least one next level associative memory; and a second memory structure associated with the at least one next-level associative memory configured, such that, in response to detecting a match to an entry in the next-level associative memory, the next-level associative memory specifies a location in the second memory structure containing information related to the matching next-level associative memory entry.

55. The apparatus as in claim 54, further comprising:

a random access memory (RAMs) used as the first memory structure.

56. The apparatus as in claim 54, further comprising:

a RAM used as the first memory structure, the RAM having a length that is shorter than an IP address input into the top-level associative memory.

57. The apparatus as in claim 43, further comprising:

the hierarchical memory structure organized into fields for storing a plurality of records;

means for replacing at least one field, which originally contained a corresponding value, with a unique coordinate value (UCV) that has been generated for the corresponding value, and means for making each UCV shorter than the corresponding value that it replaces.

* * * * *

UNITED STATES PATENT AND TRADEMARK OFFICE
CERTIFICATE OF CORRECTION

| | | |
|---|---|---|
| PATENT NO. | : 7,051,078 B1 | Page 1 of 1 |
| APPLICATION NO. | : 09/613039 | |
| DATED | : May 23, 2006 | |
| INVENTOR(S) | : David R. Cheriton | |

It is certified that error appears in the above-identified patent and that said Letters Patent is hereby corrected as shown below:

Column 16, Line 59, Claim 42:

should read;

-- "The apparatus as in claim 30" --

Signed and Sealed this

Twenty-second Day of August, 2006

JON W. DUDAS
*Director of the United States Patent and Trademark Office*